US012792224B2

(12) United States Patent
Redmond et al.

(10) Patent No.: US 12,792,224 B2
(45) Date of Patent: Nov. 10, 2026

(54) HYBRID MEMORY WEAR-LEVELING FILE SYSTEM FOR AUTOMATION PLATFORM

(71) Applicant: Schneider Electric Systems USA, Inc., Foxborough, MA (US)

(72) Inventors: James Redmond, Richmond (CN); Zackery Sobin, Tryon, NC (US)

(73) Assignee: Schneider Electric Systems USA, Inc, Foxborough, MA (US)

( * ) Notice: Subject to any disclaimer, the term of this patent is extended or adjusted under 35 U.S.C. 154(b) by 0 days.

(21) Appl. No.: 19/198,920

(22) Filed: May 5, 2025

(65) Prior Publication Data

US 2026/0349603 A1 Nov. 5, 2026

(51) Int. Cl.
*G06F 3/06* (2006.01)
*G06F 12/02* (2006.01)

(52) U.S. Cl.
CPC .......... *G06F 3/0616* (2013.01); *G06F 3/0631* (2013.01); *G06F 3/0643* (2013.01); *G06F 3/068* (2013.01); *G06F 12/0246* (2013.01)

(58) Field of Classification Search
None
See application file for complete search history.

(56) References Cited

U.S. PATENT DOCUMENTS

| | | | | |
|---|---|---|---|---|
| 10,705,953 | B2 | 7/2020 | Hu | |
| 11,526,445 | B2 | 12/2022 | Williams et al. | |
| 12,223,176 | B1 * | 2/2025 | Alkalay | G06F 3/0616 |
| 2020/0285391 | A1 * | 9/2020 | Sun | G06F 3/0649 |
| 2023/0097187 | A1 | 3/2023 | Tai et al. | |
| 2023/0315300 | A1 * | 10/2023 | Quinones Sepulveda | G06F 3/0653 711/154 |
| 2025/0341972 | A1 * | 11/2025 | Li | G06F 3/0616 |
| 2026/0154196 | A1 * | 6/2026 | Jang | G06F 3/0652 |

* cited by examiner

*Primary Examiner* — Kaushikkumar M Patel
(74) *Attorney, Agent, or Firm* — Stinson LLP

(57) ABSTRACT

A hybrid memory wear-leveling system in a file system of an automation platform. A wear-leveling processor performs a wear leveling operation within a finite lifespan storage memory by identifying a wear-level of the physical blocks. In response to a gap in the wear-level the wear-leveling processor moves hot write data of the finite lifespan storage memory to unallocated blocks. The wear-leveling processor further identifies whether to perform a wear-leveling operation between the finite lifespan storage memory and the extended lifespan storage memory. The wear-leveling processor determines whether hot write or cold data of the finite lifespan storage memory should be migrated to the extended lifespan storage memory. Additionally, the wear-leveling processor determines whether cold data of the extended lifespan storage memory should be migrated to the finite lifespan storage memory. The wear-leveling processor also performs a wear-leveling process within the extended lifespan storage memory.

20 Claims, 6 Drawing Sheets

HYBRID MEMORY WEAR-LEVELING FILE SYSTEM FOR AUTOMATION PLATFORM

BACKGROUND

Automation platforms include file systems for managing operation of the industrial automation system in which they reside. These file systems include files with varying levels of priority and access frequency. To provide high access, an automation platform may include a high performance memory such as flash memory or battery backed static random access memory (BBSRAM). However, frequent writing of files to flash memory leads to degradation of its physical storage blocks. This degradation decreases capacity of the flash memory and a loss of performance for the system as a whole over time. Alternatively, an automation platform may include a slower memory with a longer expected lifespan, such as nonvolatile random access memory (NVRAM) or even a hard disk drive (HDD). While an extended lifespan memory can survive frequent write operations, it fails to provide the highest performance for files of the automation system that require high access frequency.

SUMMARY

Aspects of the present disclosure provide a system for wear-leveling hybrid memory for a file system of an automation platform. One or more wear-leveling processors performs write operations of the file system by determining whether a write operation is a privileged write to the finite lifespan storage memory. If the write is not privileged, the wear-leveling processors determine whether to write to the extended lifespan storage memory based on the write frequency of the block. In response to a low write frequency, the wear-leveling processors determine whether to write the file to the finite lifespan storage memory due to a high read rate or, alternatively, to the extended storage memory due to a low read rate. Following a write operation, the wear-leveling processors may perform a system wear-leveling operation. The wear-leveling processors identify whether to perform an operation within the finite lifespan storage memory based on the wear rate of the hot write and cold data of the finite lifespan memory. If needed, the wear-leveling processors migrate hot write data within the finite lifespan storage memory to balance wear. The wear-leveling processors also identify whether to migrate data between the finite lifespan storage memory and the extended lifespan storage memory based on wear-rate, access rate, and/or data priority of the hot write data of the finite lifespan storage memory, the cold data of the finite lifespan storage memory, and the hot data of the extended lifespan storage memory. The wear-leveling operation concludes with performing a wear-leveling operation within the extended lifespan storage memory.

In an aspect, a system for wear leveling a hybrid memory file system includes one or more wear-leveling processors and a file system storage coupled to the wear-leveling processor. The file system storage includes a finite lifespan storage memory (FLSM) communicatively coupled to the one or more wear-leveling processors and an extended lifespan storage memory (XLSM) communicatively coupled to the one or more wear-leveling processors. The wear-leveling system further includes a wear-leveling processor memory coupled to the one or more wear-leveling processors. When executed by the one or more wear-leveling processors, computer-executable instructions stored in the memory configure the one or more wear-leveling processors for determining whether the FLSM and XLSM have sufficient storage available to perform either a FLSM wear-leveling operation or a FLSM-XLSM wear-leveling operation or both. The executable instructions further configure the one or more wear-leveling processors for identifying, in response to the FLSM and the XLSM having sufficient storage available to perform the wear-leveling operation, one or more cold FLSM files and one or more hot write FLSM files and evaluating whether to perform the FLSM wear-leveling operation based on a difference in a FLSM block wear-level between the cold FLSM files and the FLSM finite storage files. The executable instructions also configure the one or more wear-leveling processors for transferring, in response to the difference in the FLSM block wear-level requiring wear-leveling, the hot write FLSM files to one or more unallocated finite storage blocks of the FLSM to create newly allocated FLSM files. The executable instructions additionally configure the one or more wear-leveling processors for identifying one or more cold XLSM files and one or more hot XLSM files and evaluating whether to perform the FLSM-XLSM wear-leveling operation based on a difference in FLSM-XLSM usage rate between the cold FLSM files and the hot XLSM files. The executable instructions further configure the one or more wear-leveling processors for transferring, in response to the difference in FLSM-XLSM usage rate requiring wear-leveling, at least one of the cold FLSM files to one or more unallocated extended storage blocks of the XLSM or the hot XLSM files to the unallocated finite storage blocks and transferring, in response to the difference in FLSM to XLSM usage rate failing to require wear-leveling, the hot XLSM files to the unallocated extended storage blocks.

In another aspect, a method of wear-leveling a hybrid memory file system includes determining whether a finite lifespan storage memory (FLSM) has sufficient memory available to perform a wear-leveling operation and identifying, in response to the FLSM having sufficient memory available to perform the wear-leveling operation, at least one cold FLSM data and at least one hot write FLSM data. The method further includes evaluating whether to perform the wear-leveling operation based on a difference in a FLSM block wear-level between the cold FLSM data and the hot write FLSM data and transferring, in response to the difference in the FLSM block wear-level requiring wear-leveling, at least one of the hot write FLSM data to a less used unallocated finite storage block in the FLSM. The method also includes determining whether an extended lifespan storage memory (XLSM) has sufficient memory to perform the wear-leveling operation and identifying, in response to the XLSM having sufficient memory available to perform the wear-leveling operation, at least one cold XLSM data, at least one hot write XLSM data, and at least one hot read XLSM data. The method additionally includes evaluating whether to perform the wear-leveling operation based on a difference in FLSM to XLSM usage rate between the cold FLSM data and the hot read XLSM data and performing the wear-leveling operation. The wear-level operation includes transferring, in response to the difference in FLSM to XLSM usage rate requiring wear-leveling, at least one of the cold FLSM data to at least one less used unallocated extended storage blocks in the XLSM and transferring, in response to the difference in FLSM to XLSM usage rate failing to require wear-leveling, at least one of the hot write XLSM data to the less used unallocated extended storage blocks within the XLSM.

In yet another aspect, a system for storing a file within a wear-leveled hybrid memory file system includes one or more wear-leveling processors and a file system storage coupled to the one or more wear-leveling processors. The file system storage includes a finite lifespan storage memory (FLSM) communicatively coupled to the one or more wear-leveling processors and an extended lifespan storage memory (XLSM) communicatively coupled to the one or more wear-leveling processors. The system for storing a file further includes a wear-leveling processor memory coupled to the one or more wear-leveling processors. When executed by the one or more wear-leveling processors, computer-executable instruction stored in the memory configure the one or more wear-leveling processors for receiving a request to write a file. The request includes a privileged write status and file information and the file information indicates a write frequency associated with the file and a read frequency associated with the file. The executable instructions further configure the one or more wear-leveling processors for writing, in response to the privileged write status indicating a direct write to FLSM, the storage block to the FLSM and evaluating, in response to the privileged write status failing to indicate a direct write to FLSM, file information. The executable instructions also configure the one or more wear-leveling processors for writing, in response to the write frequency indicating high write frequency, the file to the XLSM and writing, in response to the write frequency indicating low write frequency and the read frequency indicating low read frequency, the file to XLSM. The executable instructions additionally configure the one or more wear-leveling processors for writing, in response to the write frequency indicating low write frequency and the read frequency indicating high read frequency, the file to FLSM.

Other objects and features of the various disclosed embodiments and example arrangements will be in part apparent and in part pointed out herein.

BRIEF DESCRIPTION OF THE DRAWINGS

Corresponding reference characters indicate corresponding parts throughout the drawings.

DETAILED DESCRIPTION

The features and other details of the concepts, systems, and techniques sought to be protected herein will now be more particularly described. It will be understood that any specific embodiments described herein are shown by way of illustration and not as limitations of the disclosure and the concepts described herein. Features of the subject matter described herein can be employed in various embodiments without departing from the scope of the concepts sought to be protected.

In automated industrial systems, an automation platform manages operation, configuration, and monitors the various devices of the system. To facilitate these objectives, the automation platforms include a file system for managing the data associated with the components of the industrial automation system. The files of the file system contain information related to managing the operation of the devices of the system, application information for monitoring the system, information collected from sensors of the system, alarm history information, and configuration information. Each different type of information, or even information within a given category, has a different access/read rate and a different write rate. Due to hardware and environmental limitations, automation platforms often only utilized one form of memory for data storage. Designs under these system constraints fail to leverage multiple tiers of data storage that provide a high level of performance and while optimizing lifespan of the memory storage devices.

Without further configuration, automation platforms that incorporate multiple forms of memory such as flash and nonvolatile random access memory (NVRAM) do not leverage the memory in optimal ways for the industrial automation system. While some solutions may optimize tiered data, utilizing kernel level optimization within an operating system, these solutions do not adequately address the needs of the industrial automation environment. Similarly, device level wear-leveling on a flash drive fails to account for the performance and environmental needs of the automation platform by migrating data from one tier of memory storage to another.

An automation platform such as a supervisory control and data acquisition (SCADA) system may reside in a hard to physically access environment such as a remote oil well. Thus, replacing memory components may be impracticable. As a result, the wear of the physical blocks within a flash memory must be monitored to ensure the longest lifespan for the device. While optimizing for a flash device lifespan, the automation platform can advantageously also provide the highest level of performance for in demand files of the file system. Thus, the automation platform also advantageously can ensure that less frequently accessed data resides on lower performance memory such as the NVRAM, while high access data resides on the flash memory.

Figure 1:
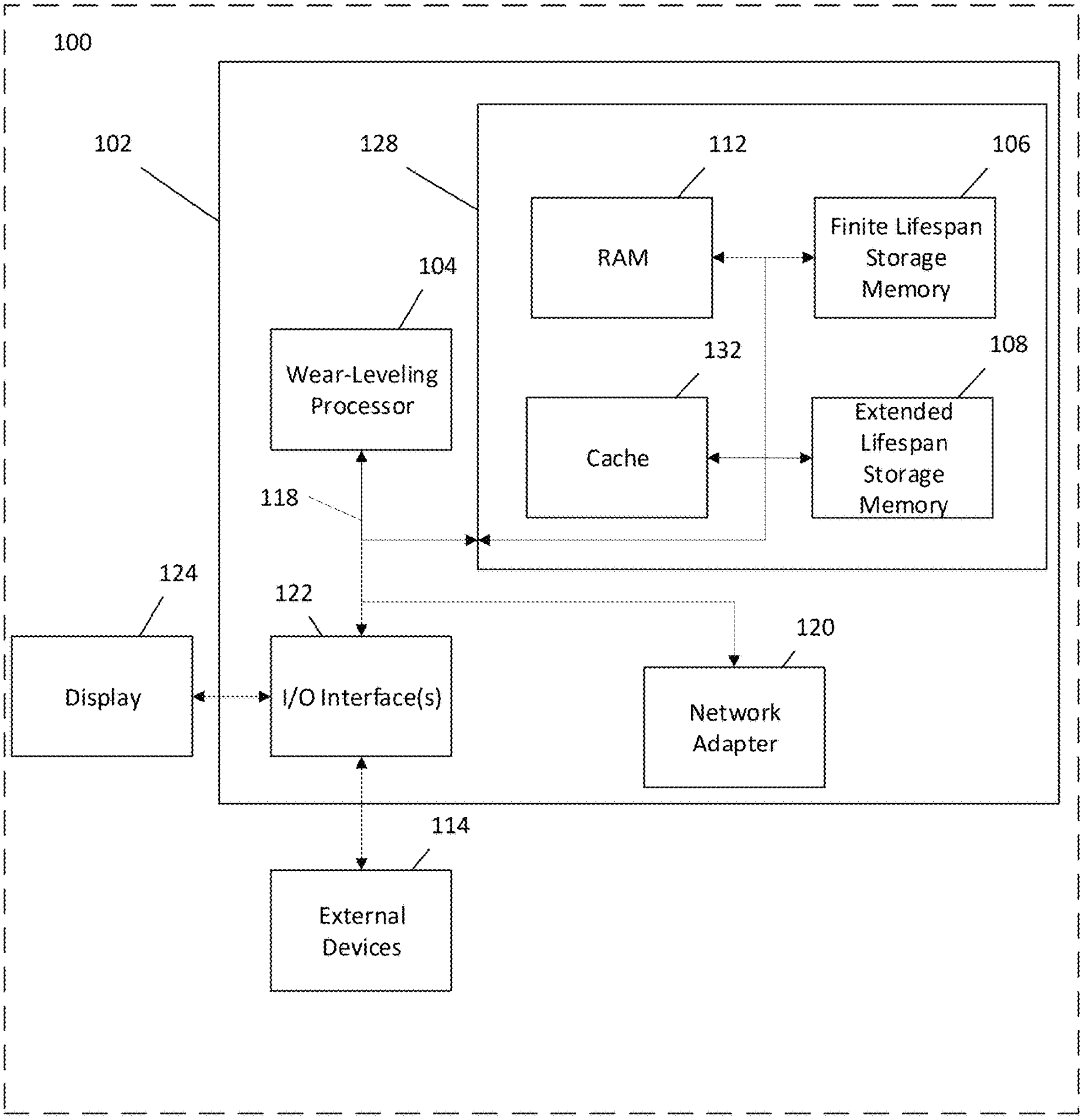
FIG. 1 is a block diagram illustrating a system for wear-leveling a file system of an automation platform according to an embodiment.

Referring to the figures and description below, a system for wear-leveling a file system in an automation platform is disclosed. FIG. 1 is a block diagram illustrating aspects of the system. In some embodiments, the system manages a file system of an automation platform 102 within the industrial automation environment. The industrial automation environment may include various equipment such as programmable logic controllers (PLCs), sensors, remote terminal units (RTUs), automation devices, and human-machine interfaces (HMI) for performing an industrial process such as energy generation and management. In some embodiments, the automation platform is SCADA system. For clarity, the various equipment in the industrial automation are not depicted in FIG. 1, but will be well understood by those of skill in the art.

Referring to FIG. 1, the system includes a wear-leveling processor 104. The wear-leveling processor 104 performs operations to manage the wear of the physical blocks of both a finite lifespan storage memory (finite storage or FLSM) 106 and an extended lifespan storage memory (extended storage or XLSM) 108 of the system memory 128, described further below. In some embodiments the wear leveling processor 104 includes one or more processors for performing wear-leveling. In one or more embodiments, the wear-leveling processor 104 is configured to operate as a processor of the automation platform 102, which serves a supervisory system for the industrial automation system. As a result, the wear-leveling processor 104 also serves to manage the file system of the industrial automation system. The files within the file system may include configuration settings for devices of the automation system, instructions for controlling equipment of the system, or instructions for monitoring sensors and alarming in response to events.

As shown in FIG. 1, the wear-leveling processor 104 couples electronically with the system memory 128. System memory 128 can include computer system readable media in the form of volatile memory, such as random-access memory (RAM) 112 and/or cache memory 132. Wear-leveling system 100 may further include other removable/non-removable, volatile/non-volatile computer system storage media. System memory 128 further includes a finite storage 106. The finite storage 106 is a high-performance memory that provides quick access to often requested files of the automation platform 102, also known as hot data. The finite storage 106 may be a flash memory such as an SD card or any other memory with a finite lifespan due to write wearing. The system memory 128 further includes the extended storage 108. The extended storage 108 stores files of the automation platform 102 that may either be less often re-written or less often accessed, also known as cold data. Although the terms hot and cold data are imprecise, those skilled in the art understand classifying such data can be user-defined based on application needs and the hardware environment. The finite storage 106 and the extended storage 108 together store the file system of the automation platform 102. Although the finite storage 106 and extended storage 108 are described as a flash memory and NVRAM, respectively, the wear-leveling process may be applied to any suitable tiered performance and lifespan data storage. For example, an extended storage 108 could include a hard disk drive (HDD), while the finite storage 106 could include Non-Volatile Memory Express (NVMe). Alternatively, for high performance needs the finite storage 106 could include battery backed static random access memory (BBSRAM), while the extended storage 108 could be a flash memory or NVSRAM. Additionally, while the wear-leveling processor 104, the finite storage 106, and the extended storage 108 are described as managing and storing a file system, the system may store or manage any data using any data management system.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Wear-leveling system 100 may also communicate with one or more external devices 114 such as a keyboard, a pointing device, a display 124, etc.; one or more devices that enable a user to interact with wear-leveling system 100; and/or any devices (e.g., network card, modem, etc.) that enable wear-leveling system 100 to communicate with one or more other computing devices. Such communication can occur via Input/Output (I/O) interfaces 122. Still yet, wear-leveling system 100 can communicate with one or more networks such as a LAN, a general WAN, and/or a public network (e.g., the Internet) via network adapter 120. As depicted, network adapter 120 communicates with the other components of a network (not shown) via bus 118. It should be understood that although not shown, other hardware and/or software components could be used in conjunction with wear-leveling system 100. Examples, include, but are not limited to: microcode, device drivers, redundant processing units, external disk drive arrays, RAID systems, tape drives, and data archival storage systems, and so on.

Figure 2:
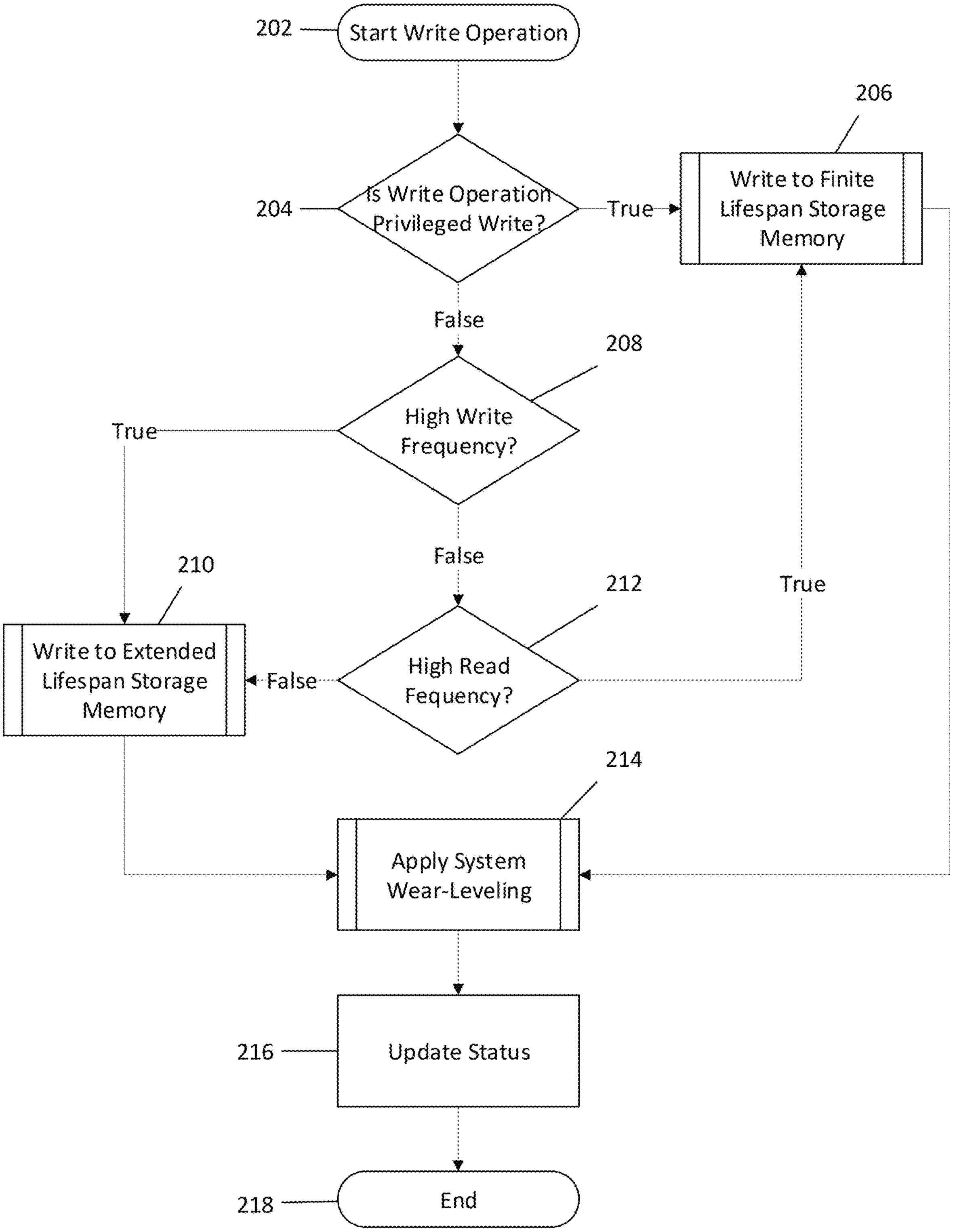
FIG. 2 is a flow diagram illustrating a process for writing a file in a wear-leveled automation platform file system according to an embodiment.

FIG. 2 is a flow diagram illustrating a process of writing a file to the wear-leveled file system of an automation platform (e.g., the automation platform 102 of FIG. 1), according to an embodiment. At step 202, the wear-leveling processor 104 receives a request to perform a write operation. The write request includes information such as a privileged write status and/or file information. The file information may include information about the file being written, if available, such as a read frequency or a write frequency of the file. The wear-leveling processor 104 evaluates the privileged write status at step 204. The privileged write status indicates whether a write advantageously should immediately be written to the finite storage 106 without further evaluation. For example, the file request may come from a high priority application or system within the industrial automation environment such that the file will optimally require high-performance availability. If the privileged write status indicates the file advantageously should be written directly to the finite storage 106, the wear-leveling processor 104 writes the file to the finite storage 106 at step 206. In some embodiments, after writing the file, the wear-leveling processor 104 performs a system wear-leveling operation at step 214, further described below.

Still referring to FIG. 2, if the file request does not include a privileged write status indicating a direct write to the finite storage 106, the wear-leveling processor 104 evaluates the write frequency of the file information at step 208. The write frequency indicates how often the requested file is expected to be re-written. If a file will be frequently re-written, increased wearing may occur on the physical memory block storing the file. As a result, it is preferred to store highly written files to memory with an extended lifespan to limit the wearing on the finite storage 106. Thus, if the write frequency exceeds a threshold, the wear-leveling processor 104 writes the file to the extended storage 108 at step 210. In some embodiments, an operator of the system configures the threshold for determining whether a write should go to the extended storage 108. In other embodiments, the wear-leveling processor 104 calculates the threshold by evaluating the write frequency relative to an expected number of lifetime writes for a block of the finite storage 106. In yet another embodiment, the wear-leveling processor 104 determines the threshold by evaluating the write frequency relative to a remaining number of expected writes for the finite storage 106. Following the completion of the write to the extended storage 108, the wear-leveling processor 104 proceeds to perform a system wear-leveling operation at step 214, described further below.

Continuing with FIG. 2, if the wear-leveling processor did not determine a high write frequency at step 208, the wear-leveling processor 104 evaluates the read frequency of the file information at step 212. The read frequency indicates how often the file to be written is expected to be read. If a file is to be read often, it is desirable to ensure the quickest access time for the file to ensure high-performance of the system. As a result, if the read frequency indicates a high read frequency, the wear leveling processor 104 writes the file to the finite storage 106 at step 206. Alternatively, if the read frequency indicates a low read frequency, the wear-leveling processor 104 writes the file to the extended storage 108 at step 210. In some embodiments, following the completion of the write to either the finite storage 106 or the extended storage 108, the wear-leveling processor 104 proceeds to perform a system wear-leveling operation at step 214, illustrated by FIG. 3 and described further below. After completion of the system wear-leveling operation, the wear-leveling processor 104 updates a status for the write operation at step 216 before ending at step 218.

The write operation process of FIG. 2 ensures optimized performance for accessing the files of the file system, while also optimizing the lifespan for the finite storage 106. The process provides that an application of the industrial automation system can ensure high performance for a given piece of data using the privileged write status. Further, the system avoids placing frequently written data in the finite storage 106. As a result, in at least some embodiments, only if a file to be written has a write frequency below the threshold and a high access frequency does the file get stored in the high-performance finite storage 106.

Figure 3:
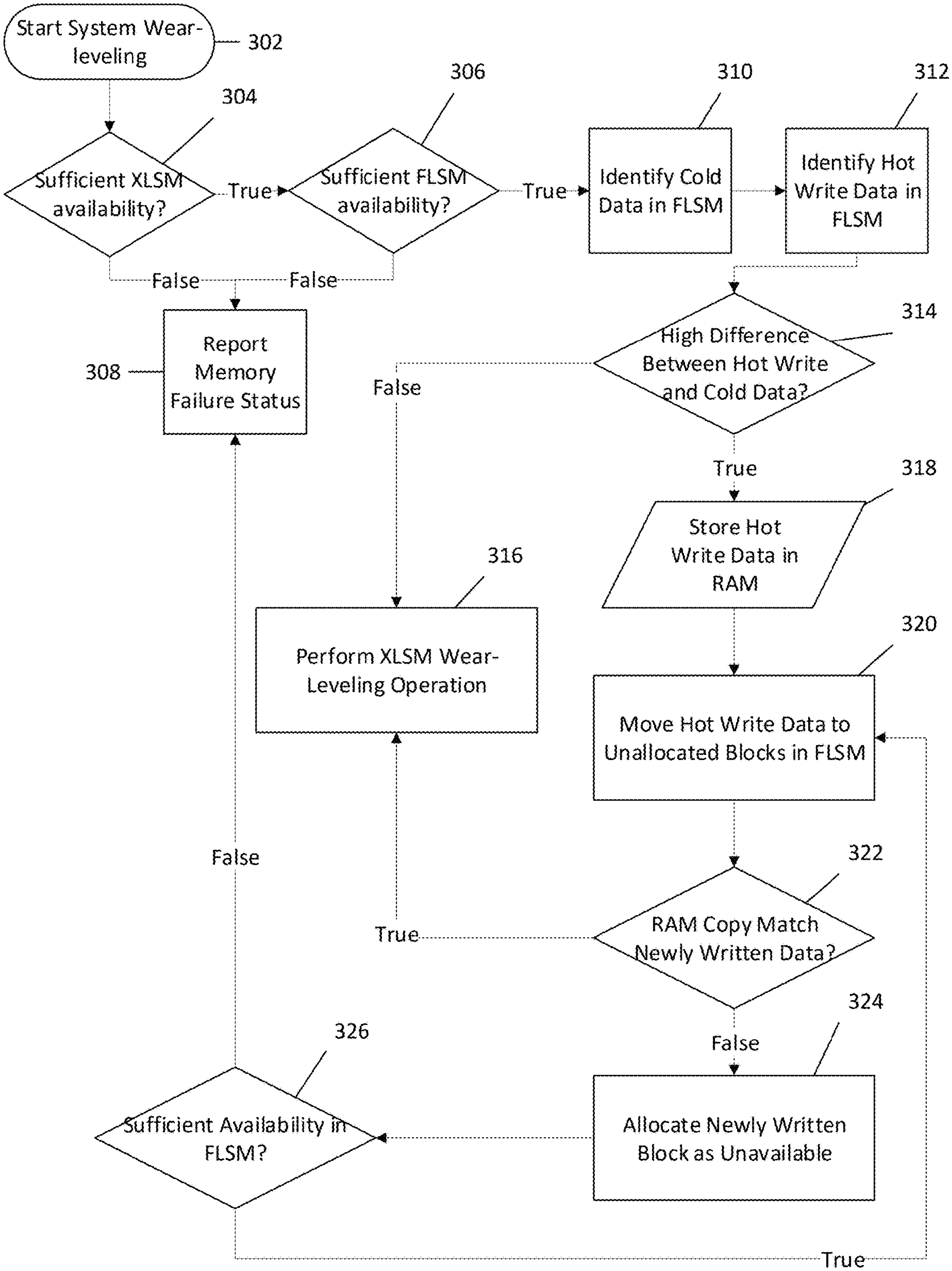
FIG. 3 is a flow diagram illustrating a process for wear-leveling a finite lifespan storage memory according to an embodiment.

FIG. 3 is a flow diagram illustrating the process of performing system wear-leveling of a finite storage 106 according to an embodiment. The process begins with receiving a system wear-leveling operation request at step 302. In some embodiments, the wear-leveling request is triggered during a write operation, described above. In other embodiments, a user sends an input to the wear-leveling processor 104 to trigger a system wear-leveling operation. In yet another embodiment, the system wear-leveling operation takes place on a regular cadence such as during a maintenance window or each day at a set time. The wear-leveling operation proceeds with determining whether the extended storage 108 has sufficient memory to perform a wear-leveling operation at step 304. The wear-leveling operation requires moving files or data from within a memory such as the extended storage 108 and also moving data between the extended storage 108 and the finite storage 106. As a result, for advantageous operation, there should be sufficient available capacity shift data within the memories. Sufficient memory may be determined by an expected amount of memory to be moved or by setting a limit for the operation. For example, in some arrangements, while a wear-leveling operation may take place utilizing only a single available block, in these examples, performing the operation requires the wear-leveling processor 104 to shuffle only using the one available block. Utilizing only a single block, in these examples, causes operation to be more inefficient, and limits the value in performing the operation since the memory is near maximum capacity. Similarly, the wear-leveling processor 104 evaluates the available memory of the finite storage 108 at step 306. If either memory has insufficient availability for performing the wear-leveling operation (answer at step 306 is "False"), the wear-leveling processor 104 reports a memory failure status at step 308 and the wear-leveling operation terminates.

Continuing with FIG. 3, if the answer at step 306 is "True," indicating both memories have sufficient availability, then at step 310, the wear-leveling operation proceeds with determining the cold data of the finite storage 106. The cold data may be determined by evaluating statistics of the files within the file system and/or data block statistics of the finite storage 106. The cold data of the finite storage 106 includes data which access/read rate falls below a certain threshold. Alternatively, or additionally, the cold data may include data which has a low write frequency. In some embodiments, the threshold could be configured by an operator. In other embodiments, the threshold sets a range for an acceptable access rate difference between hot data and cold data of the system.

In one embodiment, the wear-leveling processor calculates a data priority in addition to evaluating the access rate at step 310. In one embodiment, a Data priority may be calculated by the equation:

$$\text{Data Priority} = \frac{a*(\text{data access frequency})*b*(\text{data access priority})}{c*(\text{data write frequency})*d*(\text{remaining finite memory lifespan})}$$

The constants a, b, c, and d represent weights for the respective associated variables that an operator may input based on the automation platform 102 needs and file system usage. For example, an operator may adjust the weights for data priority to balance for files with both a high read and write frequency. In some environments, an operator may prefer to ensure that high read data remains in the finite storage 106 even when such data has a high write frequency. In other environments, the operator may prefer to maximize lifespan for the finite storage 106, thus any files with a high write frequency should be moved to the extended storage 108. Thus, if the calculated data priority falls below the input threshold, the data or file in the finite storage 106 may be determined to be cold data with a low data priority. The calculation above represents one example for evaluating the data priority for a file of the file system, other calculations or metrics may be used based on the needs of the industrial system. For example, the data priority equation could be modified to remove an access priority as a term. Thus, each file's priority is determined solely based on its usage rather than including an application or system assigned priority weight.

Still referring to FIG. 3, the wear-leveling processor 104 proceeds with identifying hot write data of the finite storage 106 at step 312. The hot write data of the finite storage 106 includes data that is frequently written. In one embodiment, the wear-leveling processor 104 identifies hot write data based on the write frequency of the file and/or data block. In some embodiments, the wear-leveling processor 104 also determines a data priority for the hot write data utilizing a calculation described above. By applying the data priority equation above a file may have a lower data priority due to having either a very high write frequency relative to the read frequency or by having a very low read frequency alone. As a result, the data priority equation enables to distinguish between hot write files based on the data priority where the priority reflects a ratio of reads relative to writes below the threshold.

Figure 4A:
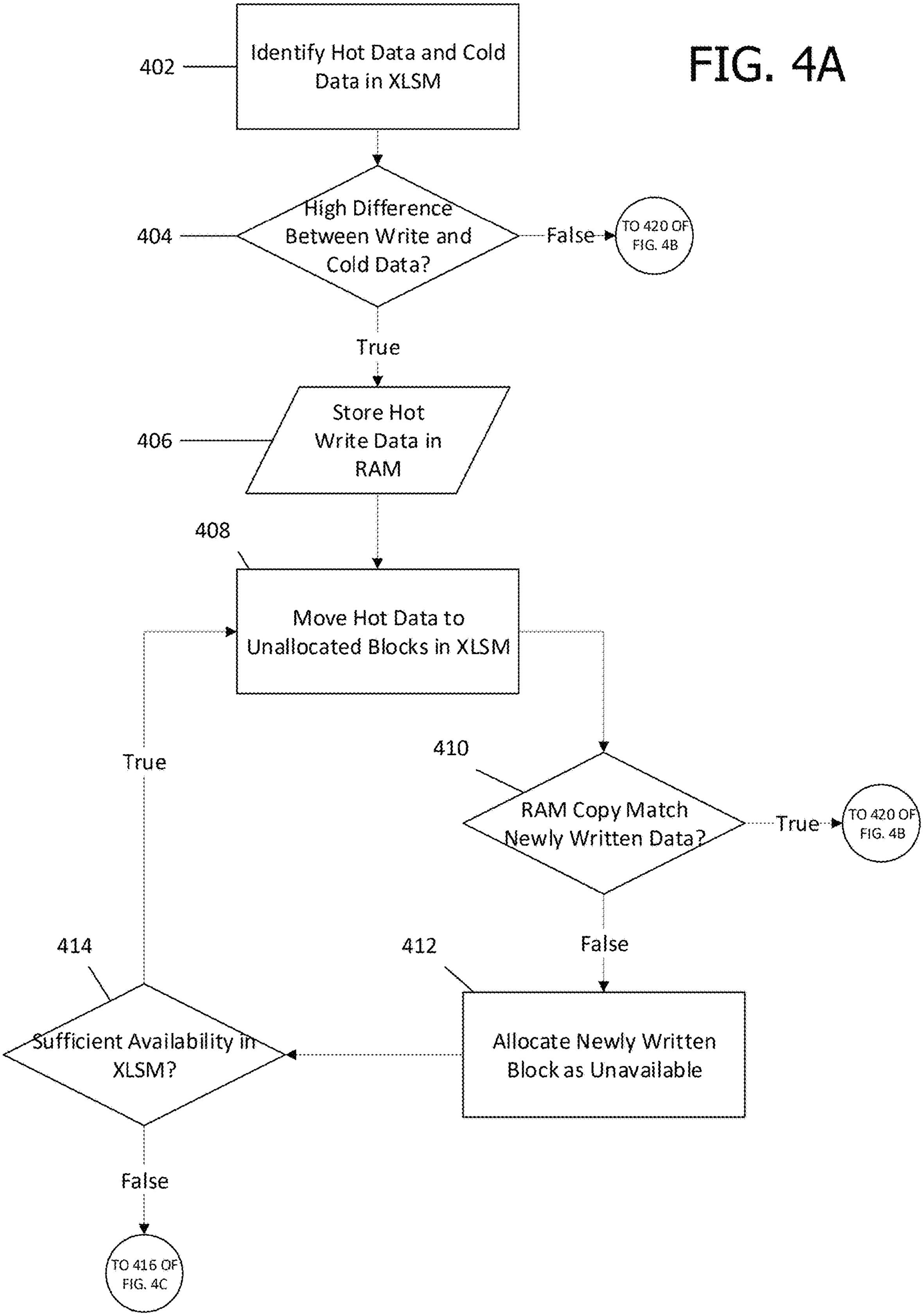
FIGS. 4A to 4C are a flow diagram illustrating a process for wear-leveling between an extended lifespan storage memory according to an embodiment.
Figure 4B:
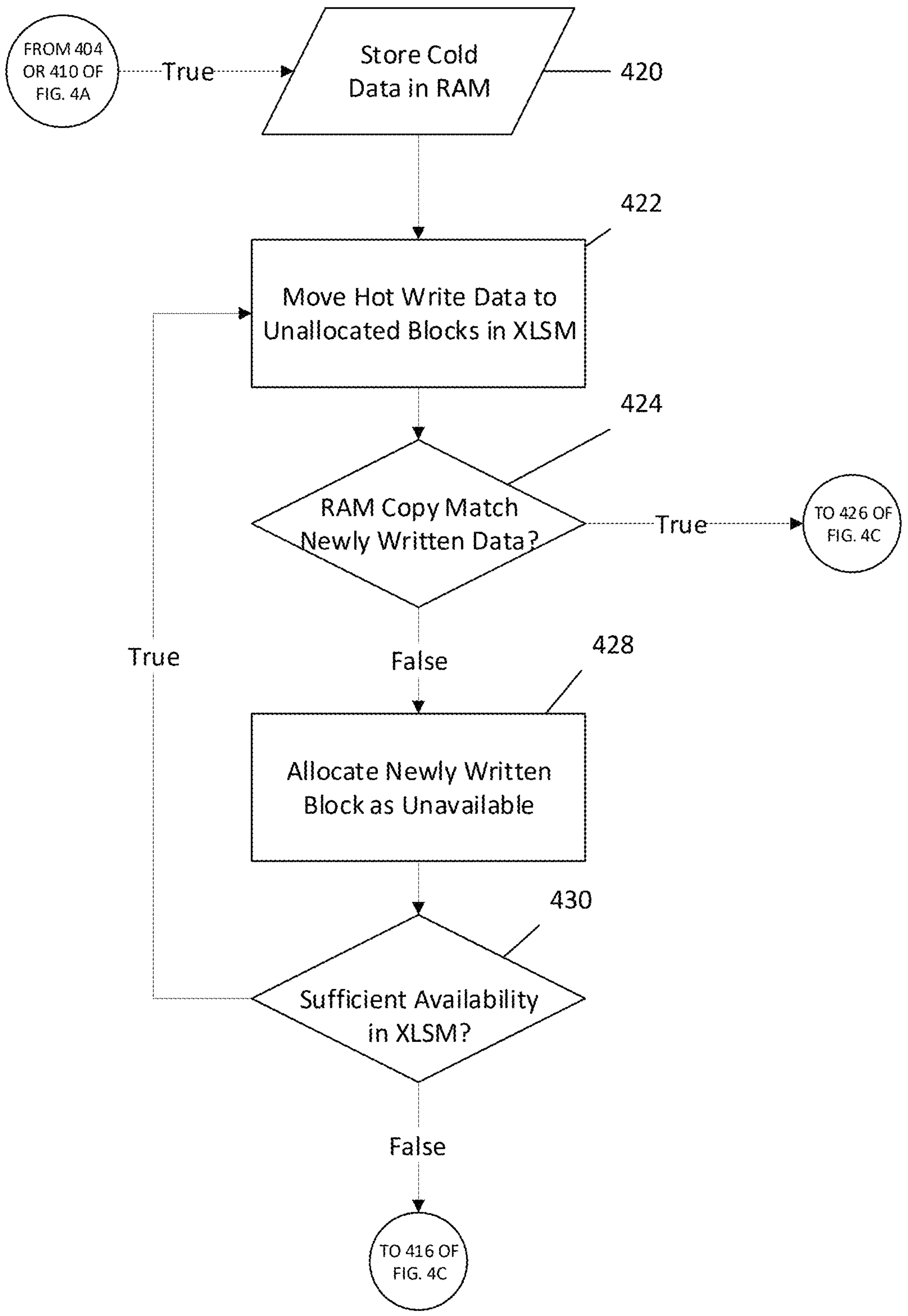
Figure 4C:
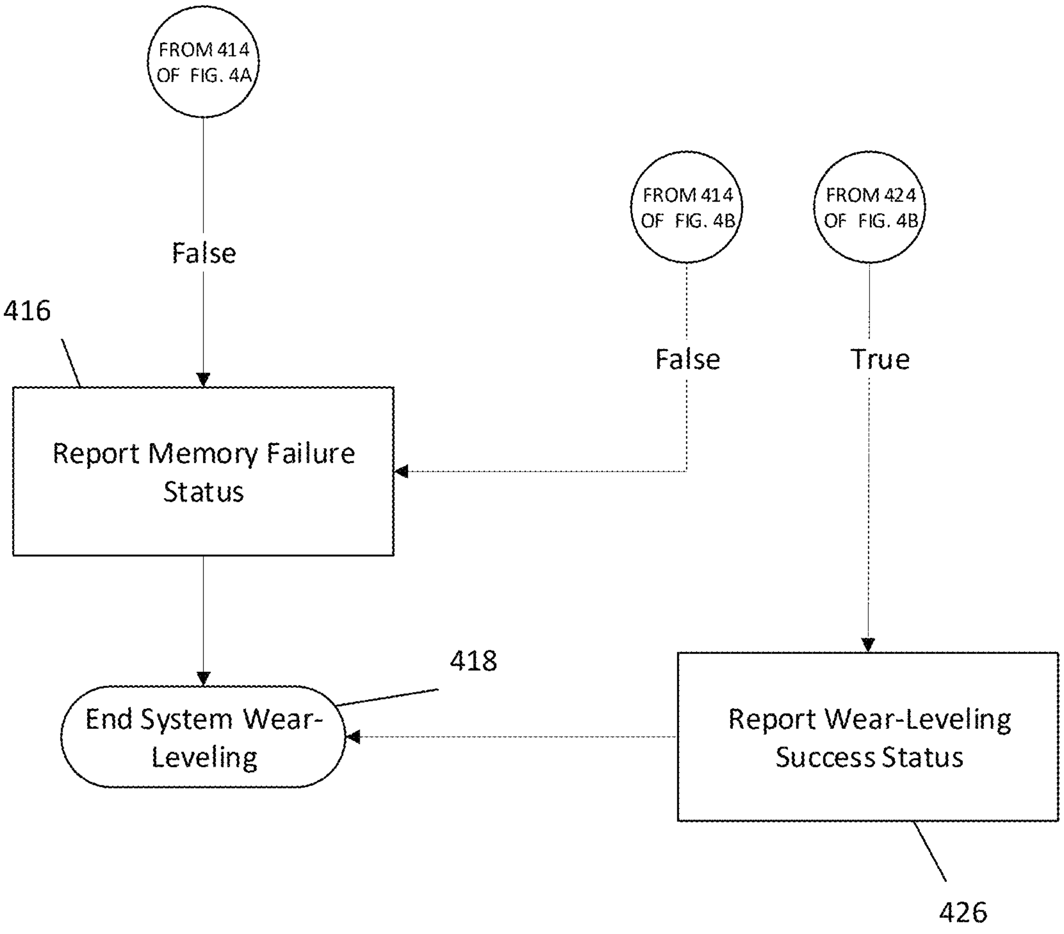

Continuing with FIG. 3, the wear-leveling processor 104 evaluates the wear-levels of the cold and hot write data at step 314. The wear-leveling processor 104 compares the wear-level of the hot write data and cold data to determine whether the difference in wear-level exceeds a threshold and therefore requires a wear-leveling operation within the finite storage 106. At step 316, if the wear-leveling processor 104 determines a low difference between the wear-level of the physical blocks, the wear leveling operation proceeds with evaluating the extended storage 108, as shown in FIGS. 4A-4C and further described below. Otherwise, the wear-leveling processor 104 proceeds to perform wear-leveling of the finite storage 106. In some embodiments, the wear-leveling processor 104 may evaluate a data priority of the hot write data of the finite storage 106 to determine whether the hot write data should be migrated to the extended storage 108. In one embodiment, the data priority calculation balances for the read and write rates through the weights. As a result, an operator may configure the system to ensure that the hot write data remain within the finite storage 106 due to a high data priority. Alternatively, rather than migrating the hot write data within the finite storage 106, the wear-leveling processor 104 may migrate the hot write data with a low data priority calculation to the extended storage 108 as illustrated in FIGS. 4A-4C and described further below.

As shown in FIG. 3, the wear-leveling operation begins with storing the hot write data of the finite storage 106 in the RAM 112 of the wear leveling processor at step 318. To ensure data integrity during the wear-leveling operation, the wear-leveling processor 104 first places the hot write data into RAM 112. Then at step 320, the wear-leveling processor 104 moves the hot write data of the finite storage 106 into unallocated blocks of the finite storage 106. The wear-leveling processor 104 identifies target physical blocks of memory for the hot write data based on availability and wear information including write frequency and expected remaining lifetime of the block. The wear-leveling processor targets the least previously used physical blocks to balance wear across the finite storage 106.

After moving the hot write data to the unallocated blocks of the finite storage 106, the wear-leveling processor 104 validates the data and/or file at step 322 of FIG. 3. The wear-leveling processor 104 validates the data by comparing the copy of the data stored in RAM 112 to the newly stored data as a result of step 318. If the copy of the hot write data stored in RAM 112 matches the newly written data, the process returns to migrate the next hot write data at step 318 as needed or alternatively, proceeds to step 316 to perform wear-levelling of the extended storage 108 as shown in FIGS. 4A-4C. If the copy of the hot write data stored in RAM 112 does not match the newly written copy, the wear-leveling processor 104 allocates the newly written block as unavailable at step 324. The copy of the hot write data stored in RAM 112 may fail to match the newly written block for a variety of reasons. For example, if during the write operation the wear-leveling processor 104 receives a write operation for the hot write data to be migrated, the wear-leveling processor 104 will overwrite the data stored in RAM 112. As a result, the newly written data will not match the RAM 112 copy. Alternatively, a mismatch may also occur due to a memory failure within the finite storage 106. For example, if the finite storage 106 is reaching end of life across all blocks, unallocated blocks may already have significant wearing. As a result, migrating the copy to the unallocated block may fail.

Continuing with FIG. 3 at step 326, after failing the migration of the hot write data, the wear-leveling processor 104 evaluates if there is enough memory in the finite storage 106 to proceed with the wear-leveling operation. If there is sufficient memory available, the wear-leveling processor 104 attempts to write the data again starting at step 320. If there is insufficient memory available, the wear-leveling processor 104 reports a memory failure status at step 308 and the wear-leveling operation terminates.

FIGS. 4A-4C together comprise a flow diagram illustrating the process of wear-leveling the extended storage 108 following the wear-leveling of the finite storage 106 as shown in FIG. 3. First, at step 402, the wear-leveling processor 104 identifies the hot data and cold data of the extended storage 108. Similar to the identification of the hot data and cold data of the finite storage 106, the wear-leveling processor 104 evaluates the stored data within the extended storage 108 to identify candidates for migration. In some embodiments, the hot data of the extended storage 108 includes hot write data with a low data priority to be migrated within the extended storage 108. In one or more embodiments, the hot data of the extended storage 108 includes data with a high access/read rate such that the data has a high data priority requiring migration to the finite storage 106. The wear-leveling processor 104 may apply the data priority equation above to determine a data priority associated with both the hot and cold data. In some embodiments, the data priority equation utilizes the same weights for evaluating the extended storage 108 as were used in evaluating the finite storage 106. In other embodiments, other weights may be applied due to the performance and lifespan difference between the memories. For example, the data write frequency and/or memory lifespan weights may be lowered because the extended storage 108 should have less wearing issues. Thus, during a wear-leveling operation less hot write data may be identified within the extended storage 108 as requiring migration within the device.

Still referring to FIGS. 4A-4C, the wear-leveling processor 104 evaluates the hot data and the cold data of the extended storage 108 at step 404. Much like evaluation of the hot write data and cold data of the finite storage 106, the wear-level processor 104 determines whether there is a high difference in access, usage, and/or wear-level rates of the hot data and cold data of the extended storage lifespan storage memory 108. If the difference in wear-level rates exceeds a threshold (answer at step 404 is "True"), the wear-leveling processor 104 performs a wear leveling operation within the extended storage 108 and proceeds to step 406. Alternatively, if the difference fails to exceed the threshold (answer at step 404 is "False"), the wear-leveling processor 104 performs a wear-leveling operation between the finite storage 106 and the extended storage 108, shown in FIG. 4B, and proceeds to step 420.

Continuing with FIGS. 4A-4C at step 406, the wear-leveling processor begins a wear-leveling operation within the extended storage 108 by copying the hot data or file to be moved to the RAM 112. As previously mentioned, copying the file to be moved into RAM 112 ensures data integrity during ongoing operations of the automation platform 102. Next the wear-leveling processor 104 moves the hot data of the extended storage 108 to one or more unallocated blocks of the extended storage 108 at step 408. The unallocated block is selected based on its availability and wear information indicating previous write frequency and expected remaining lifetime. At step 410, following moving the data to the newly written data, the wear-leveling processor validates the newly written data against the copy stored in RAM 112. If the newly written data matches the copy store in RAM 112, the wear-leveling processor 104 proceeds to perform the finite storage 106 to extended storage 108 wear-leveling operation at step 420 (FIG. 4B). If the newly written data fails to match the copy in RAM, the wear-leveling processor 104 allocates the block of the newly written data as unavailable at step 412. Then, at step 414, the wear-leveling processor 104 determines whether there is sufficient memory in the extended storage 108 to complete the wear-leveling operation. If there is insufficient memory, the wear-leveling processor 104 reports a memory failure status at 416 (FIG. 4C) and ends execution of the wear-leveling operation at 418. If sufficient memory is available, the wear-leveling processor attempts to move the hot data again starting at step 408.

As illustrated in FIGS. 4A-4C, the wear-leveling processor 104 starts a wear-leveling operation between the finite storage 106 and the extended storage 108 by moving the cold data of the finite storage 106 into RAM 112 at step 420 (FIG. 4B). After copying the cold data of the lifespan memory 106 into RAM 112, the wear-leveling processor 104 moves the cold data into unallocated blocks of the extended storage 108 at step 422. Then the wear-leveling processor 104 validates the newly written data in the extended storage 108 by comparing the newly written data to the copy stored in RAM 112. If the copy in RAM 112 matches the newly written data at 424, then the wear-leveling process reports a success status at step 426 (FIG. 4C) and ends execution at step 418. If the newly written data fails to match the copy in RAM, the wear-leveling processor 104 allocates the block of the newly written data as unavailable at step 428. Then, at step 430, the wear-leveling processor 104 determines whether there is sufficient memory in the extended storage 108 to complete the wear-leveling operation. If there is insufficient memory, the wear-leveling processor 104 reports a memory failure status at 416 (FIG. 4C) and ends execution of the wear-leveling operation at 418. If sufficient memory is available, the wear-leveling processor attempts to move the cold data in the finite storage 106 again starting at step 422.

Referring again to step 420 of FIGS. 4A-4C, in some embodiments, the wear-leveling operation between the finite storage 106 and the extended storage 108 also includes hot data of the extended storage 108 which has a high data priority rate. Thus, the hot data of the extended storage 108 advantageously is migrated from the extended storage 108 to the finite storage 106. The process takes place through the same steps described above in steps 420, 422, and 424, but with the data moving from the extended storage 108 to the finite storage 108 rather than the opposite.

Through the wear-leveling process described in FIG. 3 and FIGS. 4A-4C, the wear-leveling processor 104 evaluates the cold data and hot write data of the finite storage 106 and identifies candidate data blocks and/or files suitable for relocation to the extended storage 108. The cold data of the finite storage 106 should be migrated to the extended storage 108 because their access rate does not require the performance supplied by the finite storage 106. As a result of moving these files, the finite storage 106 frees up capacity for higher priority data. The wear-leveling processor 104 also migrates hot write data of the finite storage 106 both within the finite storage 106 and out to the extended storage 108 to maximize lifespan. Allowing frequently written data to remain in the same data blocks finite storage 106 increases wear on the physical storage blocks which leads to decreased capacity and memory failure over time. Further, by identifying hot data and its associated data priority, the wear-leveling processor 104 determines whether hot data with a high data priority within the extended storage 108 needs migration to the finite storage 106 for increased performance.

Although the process of wear leveling the system as illustrated in FIGS. 3 and 4A-C are described in a specific order, some steps may be performed in a different order. For example, after identifying the hot write data and cold data to be moved to a different memory location, the wear-leveling processor 104 may copy all such data to the RAM 112 at one time. As a result, the cold data to be moved from the finite storage 106 to the extended storage 108 will already be placed in RAM and the processor 104 may immediately commence migrating the cold data. Similarly, the different wear-leveling operations within and across the finite storage 106 and the extended storage 108 may take place in any order or simultaneously depending on availability and load of the wear-leveling processor 104.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor(s) of the device.

Although described in connection with an example computing system environment, the disclosed embodiments are operational with other special purpose computing system environments or configurations. The computing system environment is not intended to suggest any limitation as to the scope of use or functionality of any aspect of any disclosed or suggested embodiments. Moreover, the computing system environment should not be interpreted as having any dependency or requirement relating to any one or combination of components illustrated in the example operating environment. Examples of computing systems, environments, and/or configurations that may be suitable for use with one or more of the various disclosed embodiments include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement at least some disclosed embodiments.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope at least some embodiments disclosed herein.

When introducing elements of embodiments and arrangements discussed herein, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use at least some example arrangements and describes several embodiments, adaptations, variations, alternatives and uses of the aspects of the disclosed arrangements, including what is presently believed to be the best mode of carrying out of at least some embodiments. Additionally, it is to be understood that the embodiments discussed and/or suggested herein are not limited in their application to the details of construction and the arrangement of components set forth in the following description or illustrated in the drawings. The arrangements described herein are capable of other embodiments and of being practiced or carried out in various ways. Also, it will be understood that the phraseology and terminology used herein is for the purpose of description and should not be regarded as limiting.

It will be apparent that modifications and variations are possible without departing from the scope defined in the appended claims. As various changes could be made in the above constructions and methods without departing from the scope of the embodiments discussed herein, it is intended that all matter contained in the above description and shown in the accompanying drawings shall be interpreted as illustrative and not in a limiting sense.

In view of the above, it will be seen that several advantages of disclosed embodiments are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The invention claimed is:

1. A system for wear leveling a hybrid memory file system, the system comprising:

one or more wear-leveling processors;

a file system storage coupled to the wear-leveling processors, the file system storage comprising:

a finite lifespan storage memory (FLSM) communicatively coupled to the one or more wear-leveling processors; and an extended lifespan storage memory (XLSM) communicatively coupled to the one or more wear-leveling processors;

a wear-leveling processor memory coupled to the one or more wear-leveling processors, the wear-leveling processor memory storing processor-executable instructions that, when executed, configure the one or more wear-leveling processors for:

determining whether the FLSM and XLSM have sufficient storage available to perform either a FLSM wear-leveling operation or a FLSM-XLSM wear-leveling operation or both;

identifying, in response to the FLSM and the XLSM having sufficient storage available to perform the wear-leveling operation, one or more cold FLSM files and one or more hot write FLSM files;

evaluating whether to perform the FLSM wear-leveling operation based on a difference in a FLSM block wear-level between the cold FLSM files and the FLSM finite storage files;

transferring, in response to the difference in the FLSM block wear-level requiring wear-leveling, the hot write FLSM files to one or more unallocated finite storage blocks of the FLSM to create newly allocated FLSM files;

identifying one or more cold XLSM files and one or more hot XLSM files;

evaluating whether to perform the FLSM-XLSM wear-leveling operation based on a difference in FLSM-XLSM usage rate between the cold FLSM files and the hot XLSM files;

transferring, in response to the difference in FLSM-XLSM usage rate requiring wear-leveling, at least one of the cold FLSM files to one or more unallocated extended storage blocks of the XLSM or the hot XLSM files to the unallocated finite storage blocks; and transferring, in response to the difference in FLSM to XLSM usage rate failing to require wear-leveling, the hot XLSM files to the unallocated extended storage blocks.

2. The system of claim 1, wherein the processor-executable instructions stored in the wear-leveling processor memory, when executed, further configure the one or more wear-leveling processors for:

applying one or more weights to at least one of a data access frequency, a data process priority, a data write frequency, or a remaining storage block lifespan; and determining, before evaluating whether to perform the FLSM-XLSM wear-leveling operation, a data priority for each of the cold FLSM files and the hot XLSM files based on the applied weights;

wherein evaluating whether to perform the FLSM-XLSM wear-leveling operation is further based on the data priority of each of the cold FLSM files and the hot XLSM files.

3. The system of claim 1, further comprising a random access memory (RAM) coupled to the one or more wear-leveling processors, and wherein the processor-executable instructions stored in the wear-leveling processor memory, when executed, further configure the one or more wear-leveling processors for:

selecting, before transferring the hot write FLSM files to the unallocated finite storage blocks, the unallocated finite storage blocks within the FLSM, wherein the unallocated finite storage blocks are selected based on a usage rate and a capacity corresponding with the hot write FLSM files;

selecting, before transferring the cold FLSM files to one or more unallocated extended storage files, the unallocated extended storage blocks within the XLSM, wherein the unallocated extended storage blocks are selected based on a usage rate and a capacity corresponding with the cold FLSM files; and selecting, before transferring the hot XLSM files to the unallocated extended storage files, the unallocated extended storage blocks within the XLSM, wherein the unallocated extended storage blocks are selected based on a usage rate and a capacity corresponding with the hot XLSM files.

4. The system of claim 1, further comprising a random access memory (RAM) coupled to the one or more wear-leveling processors and wherein the processor-executable instructions stored in the wear-leveling processor memory, when executed, further configure the one or more wear-leveling processors for:

storing, before transferring the hot write FLSM files, a copy of the hot write FLSM files in the RAM;

validating, after transferring the hot write FLSM files, the newly allocated finite storage files by comparing the copy of the hot write FLSM files in the RAM to the newly allocated FLSM files; and re-allocating, in response to the copy of the hot write FLSM files in the RAM not matching the newly allocated FLSM files, the newly allocated FLSM files as unavailable.

5. The system of claim 1, wherein the file system storage stores an industrial automation file system comprising industrial device information and automation information.

6. The system of claim 1, wherein the processor-executable instructions stored in the wear-leveling processor memory, when executed, further configure the one or more wear-leveling processors for:

transmitting, in response to the FLSM and the XLSM having insufficient memory available to perform the wear-leveling operation, a memory failure status.

7. The system of claim 1, wherein the FLSM comprises a flash memory and the XLSM comprises a non-volatile random access memory (NVRAM).

8. A method of wear-leveling a hybrid memory file system, the method comprising:

determining whether a finite lifespan storage memory (FLSM) has sufficient memory available to perform a wear-leveling operation;

identifying, in response to the FLSM having sufficient memory available to perform the wear-leveling operation, at least one cold FLSM data and at least one hot write FLSM data;

evaluating whether to perform the wear-leveling operation based on a difference in a FLSM block wear-level between the cold FLSM data and the hot write FLSM data;

transferring, in response to the difference in the FLSM block wear-level requiring wear-leveling, at least one of the hot write FLSM data to a less used unallocated finite storage block in the FLSM;

determining whether an extended lifespan storage memory (XLSM) has sufficient memory to perform the wear-leveling operation;

identifying, in response to the XLSM having sufficient memory available to perform the wear-leveling operation, at least one cold XLSM data, at least one hot write XLSM data, and at least one hot read XLSM data;

evaluating whether to perform the wear-leveling operation based on a difference in FLSM to XLSM usage rate between the cold FLSM data and the hot read XLSM data; and performing the wear-leveling operation, wherein the wear-level operation comprises:

transferring, in response to the difference in FLSM to XLSM usage rate requiring wear-leveling, at least one of the cold FLSM data to at least one less used unallocated extended storage blocks in the XLSM; and transferring, in response to the difference in FLSM to XLSM usage rate failing to require wear-leveling, at least one of the hot write XLSM data to the less used unallocated extended storage blocks within the XLSM.

9. The method of claim 8, further comprising:

applying one or more weights to at least one of a data access frequency, a data process priority, a data write frequency, or a remaining lifespan of an unallocated FLSM block; and determining, before evaluating whether to perform the wear-leveling operation, a data priority associated with each of the cold FLSM data, the hot write FLSM data, and the hot read XLSM data, wherein the data priority is based on the applied one or more weights;

wherein evaluating whether to perform the wear-leveling operation is further based on the data priority associated with each of the cold FLSM data, the hot write FLSM data, and the hot read XLSM data.

10. The method of claim 8, further comprising:

evaluating whether to perform the wear-leveling operation based on a difference in XLSM to FLSM usage rate between the hot read XLSM data and the cold FLSM data, wherein the wear-leveling operation comprises transferring at least one of the hot read XLSM data to at least one less used unallocated finite storage blocks in the FLSM.

11. The method of claim 8, further comprising:

selecting, before transferring the hot write FLSM data to the unallocated finite storage blocks, the unallocated finite storage blocks within the FLSM, wherein the unallocated finite storage blocks are selected based on being less used and corresponding in capacity with the hot write FLSM data;

selecting, before transferring the cold FLSM data to one or more unallocated extended storage data, the unallocated extended storage blocks within the XLSM, wherein the unallocated extended storage blocks are selected based on being less used and corresponding in capacity with the cold FLSM data; and selecting, before transferring the hot XLSM data to the unallocated extended storage data, the unallocated extended storage blocks within the XLSM, wherein the unallocated extended storage blocks are selected based on being less used and corresponding in capacity with the hot XLSM data.

12. The method of claim 8, further comprising:

storing, before transferring the hot write FLSM data, a copy of the hot write FLSM data in the RAM;

validating, after transferring the hot write FLSM data, the newly allocated finite storage data by comparing the copy of the hot write FLSM data in the RAM to the newly allocated finite storage data; and allocating, in response to the copy of the hot write FLSM data in the RAM not matching the newly allocated finite storage data, the newly allocated finite storage data as unavailable.

13. The method of claim 8, wherein the FLSM comprises a flash memory.

14. The method of claim 8, wherein the XLSM comprises a non-volatile random access memory (NVRAM).

15. A system for storing a file within a wear-leveled hybrid memory file system, the system comprising:

one or more wear-leveling processors;

a file system storage coupled to the one or more wear-leveling processors, the file system storage comprising:

a finite lifespan storage memory (FLSM) communicatively coupled to the one or more wear-leveling processors;

an extended lifespan storage memory (XLSM) communicatively coupled to the one or more wear-leveling processors;

a wear-leveling processor memory coupled to the one or more wear-leveling processors, the wear-leveling processor memory storing processor-executable instructions that, when executed, configure the one or more wear-leveling processors for:

receiving a request to write a file, the request comprising a privileged write status and file information, the file information indicating a write frequency associated with the file and a read frequency associated with the file;

writing, in response to the privileged write status indicating a direct write to FLSM, the storage block to the FLSM;

evaluating, in response to the privileged write status failing to indicate a direct write to FLSM, file information;

writing, in response to the write frequency indicating high write frequency, the file to the XLSM;

writing, in response to the write frequency indicating low write frequency and the read frequency indicating low read frequency, the file to XLSM; and writing, in response to the write frequency indicating low write frequency and the read frequency indicating high read frequency, the file to FLSM.

16. The system of claim 15, wherein the processor-executable instructions stored in the wear-leveling processor memory, when executed, further configure the one or more wear-leveling processors for:

applying one or more weights to at least one of the read frequency, a data process priority, the write frequency, or a remaining unallocated finite storage block lifespan; and determining, after receiving a request to write a file, the privileged write status based on comparing a data priority to a FLSM write threshold, wherein the data priority is based on the one or more applied weights.

17. The system of claim 15, wherein the privileged write status comprises a file priority status.

18. The system of claim 15, wherein the processor-executable instructions stored in the wear-leveling processor memory, when executed, further configure the one or more wear-leveling processors for:

determining, after writing the file, whether the FLSM and XLSM have sufficient memory available to perform either a FLSM wear-leveling operation or a FLSM-to-XLSM wear-leveling operation or both;

identifying, in response to the FLSM and the XLSM having sufficient storage available to perform the wear-leveling operation, one or more cold FLSM files within the FLSM and one or more hot write FLSM files within the FLSM;

evaluating whether to perform the FLSM wear-leveling operation based on a difference in a FLSM usage rate between the cold FLSM files and the hot write FLSM files;

transferring, in response to the difference in the FLSM usage rate requiring wear-leveling, the hot write FLSM files to one or more unallocated finite storage blocks of the FLSM creating newly allocated finite storage files;

identifying at least one cold XLSM files and at least one hot XLSM files;

evaluating whether to perform the FLSM-to-XLSM wear-leveling operation based on a difference in a FLSM to XLSM usage rate between the hot XLSM files and the cold FLSM files;

transferring, in response to the difference in the FLSM to XLSM usage rate requiring wear-leveling, at least one of the cold FLSM files to one or more unallocated extended storage blocks of the XLSM or the hot XLSM files to the unallocated finite storage blocks; and transferring, in response to the difference in the FLSM to XLSM usage rate failing to require wear-leveling, the hot XLSM files to the unallocated extended storage blocks.

19. The system of claim 15, wherein the FLSM comprises a flash memory and the XLSM comprises a non-volatile random access memory (NVRAM).

20. The system of claim 15, wherein the file system storage stores an industrial automation file system comprising industrial device information and automation information.

* * * * *